United States Patent Office.

HENRY A. SAWYER AND RANSOM G. SAWYER, OF MILWAUKEE, WISCONSIN.

Letters Patent No. 114,354, dated May 2, 1871.

IMPROVEMENT IN LEATHER-POLISH.

The Schedule referred to in these Letters Patent and making part of the same.

We, HENRY A. SAWYER and RANSOM G. SAWYER, of Milwaukee, in the county of Milwaukee, in the State of Wisconsin, have invented certain Improvements in "Leather-Polish," of which the following is a specification.

Nature and Object of the Invention.

The nature of the invention consists in mixing alcohol, gum shellac, gum camphor, castor-oil, sweet-oil, tincture of musk, molasses, and lamp-black.

Process of Manufacture.

Take one gallon of alcohol and put into it six ounces of gum camphor and two and one half pounds of gum shellac, and let it stand till dissolved, and take one gallon of alcohol and put into it two ounces of sweet-oil, two ounces of castor-oil, and one-fourth ounce of tincture of musk, and let it stand till they are cut. Then, with the mixture, wet six ounces of lamp-black, and add four ounces of molasses, and run the lamp-black and molasses through a paint-mill. Then mix the whole together and shake it well, and bottle for use.

To use this article take a sponge or brush and apply it to the boot or other article, and a superior polish will be produced without any rubbing, and the polish will not be affected by water, snow, or dampness, and, besides, preserves the leather.

Claim.

We claim as our invention—

A leather polish composed of alcohol, gum camphor, gum shellac, sweet-oil, castor-oil, tincture of musk, lamp-black, and molasses, in about the proportions named, and manufactured substantially as described.

HENRY A. SAWYER.
RANSOM G. SAWYER.

Witnesses:
J. B. SMITH,
WILLIAM M. HORNOR.